Figure 1:
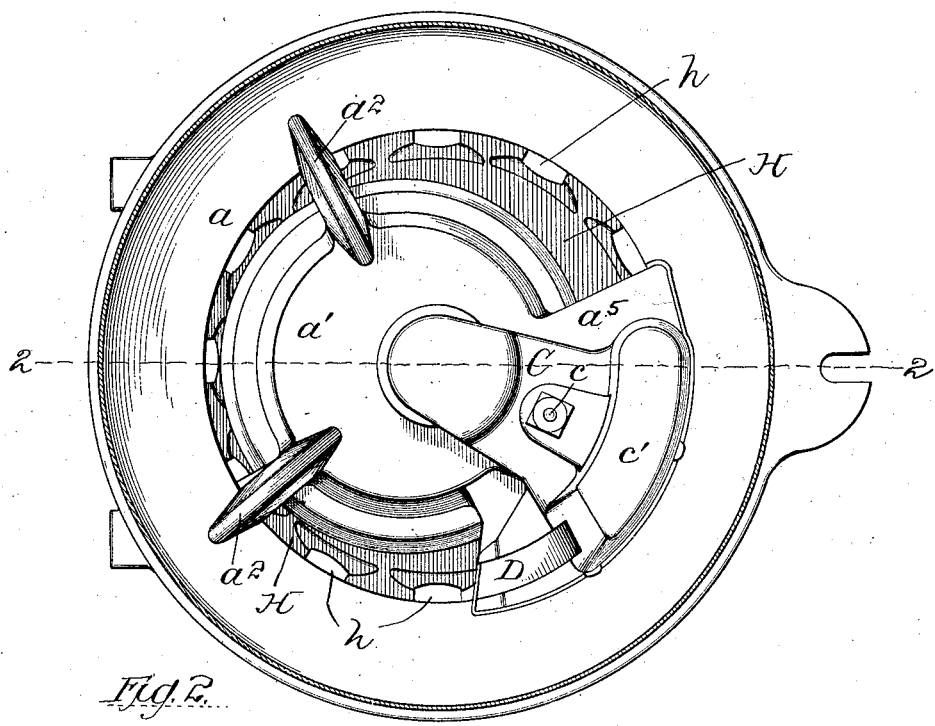

No. 769,137. PATENTED AUG. 30, 1904.
E. M. HEYLMAN.
SEED PLANTER.
APPLICATION FILED JULY 2, 1904.
NO MODEL. 3 SHEETS—SHEET 1.

Witnesses:
Walter Schalck.
Luter L. Alter.

Inventor.
Edward M. Heylman
By Pierce & Fisher
Attys.

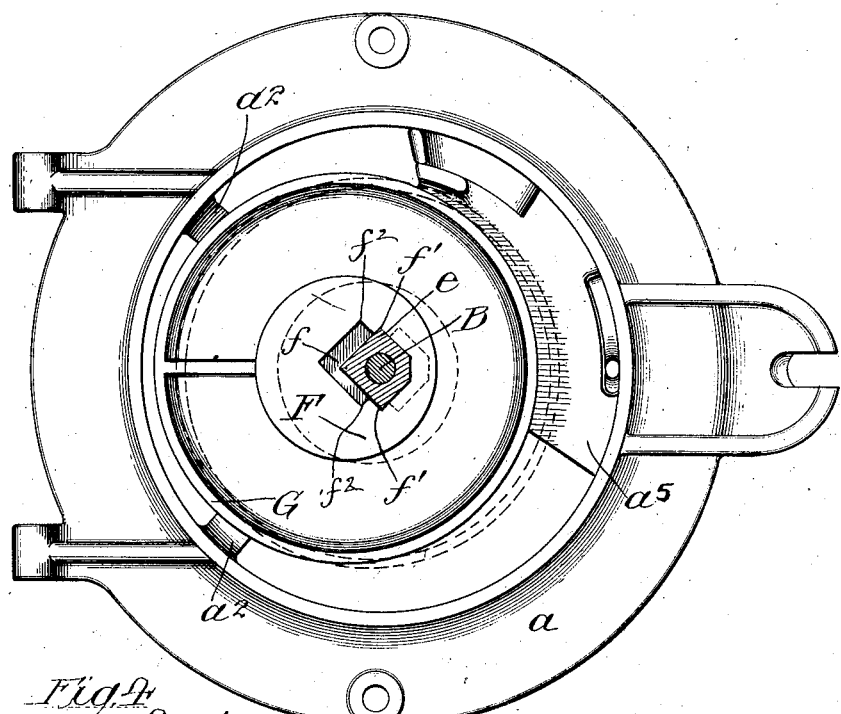
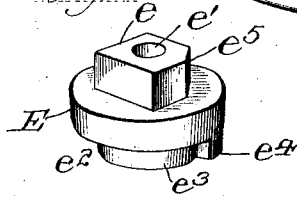
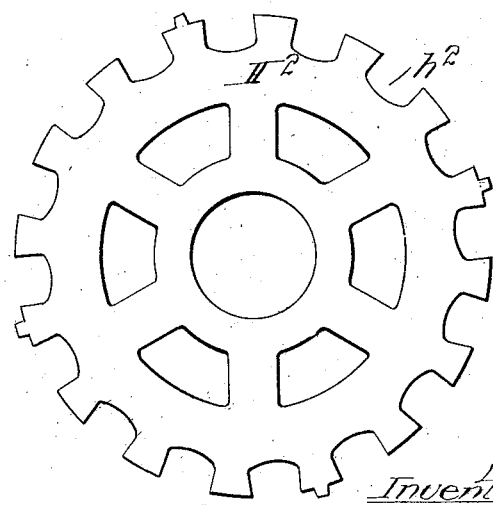
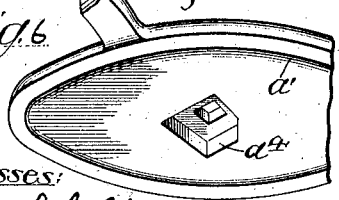

No. 769,137. PATENTED AUG. 30, 1904.
E. M. HEYLMAN.
SEED PLANTER.
APPLICATION FILED JULY 2, 1904.
NO MODEL. 3 SHEETS—SHEET 3.

Witnesses:
Walter Schalck
[signature]

Inventor.
Edward M. Heylman
By [signature]
Attys.

No. 769,137.                                                                 Patented August 30, 1904.

UNITED STATES PATENT OFFICE.

EDWARD M. HEYLMAN, OF JANESVILLE, WISCONSIN, ASSIGNOR TO JANESVILLE MACHINE COMPANY, OF JANESVILLE, WISCONSIN, A CORPORATION.

SEED-PLANTER.

SPECIFICATION forming part of Letters Patent No. 769,137, dated August 30, 1904.

Application filed July 2, 1904. Serial No. 215,050. (No model.)

*To all whom it may concern:*

Be it known that I, EDWARD M. HEYLMAN, a citizen of the United States, and a resident of Janesville, in the county of Rock and State of Wisconsin, have invented certain new and useful Improvements in Seed-Planters, of which the following is a full, clear, and exact description.

The present invention has relation more particularly to corn-planters of the type set forth in Letters Patent No. 760,394, granted to my assignee, the Janesville Machine Company, May 17, 1904. The planter set forth in said Letters Patent No. 760,394 is adapted either for "edge-drop" planting or for "flat-drop" planting, both of which methods of planting are found to have under certain circumstances peculiar advantages. In said patent the feed channel or throat of the seedbox was varied in order to adapt it for the different kinds of seed-plates with which the planting was to be effected, and such variation was effected by providing a plurality of interchangeable feed-plates, one of which was adapted, for example, for use with an edge-drop seed-plate where a varying width of feed-throat was desired and the other of which was adapted for use with a flat-drop seed-plate where a wide feed throat or channel was required.

The present invention is designed to provide a construction of planter whereby the same feed-plate may be shifted to different positions in order to properly vary the width of the feed throat or channel for either edge-drop or flat-drop planting, thus rendering unnecessary the use of separate feed-plates for such purpose.

To this end the invention consists, primarily, in providing a convertible planter having a seed-plate with means whereby said seed-plate may be set at different positions in order to vary the feed-channel.

By reference to said Letters Patent No. 760,394 it will be seen that inasmuch as the seed-plate designed for edge-drop planting is considerably thicker than the seed-plate designed for flat-drop planting two guard-plates, one thin and the other relatively thick, are employed, the thin guard-plate being designed for use with the edge-drop seed-plate and the thicker guard-plate being designed for use with the thin flat-drop seed-plate.

A further object of the present invention is to provide a guard-plate adapted for use with either a thick or thin seed-plate, and this object of invention is accomplished by providing the planter with an invertible guard-plate.

The invention consists also in other features of novelty that will be hereinafter described, illustrated in the accompanying drawings, and more particularly pointed out in the claims at the end of this specification.

Figure 2:
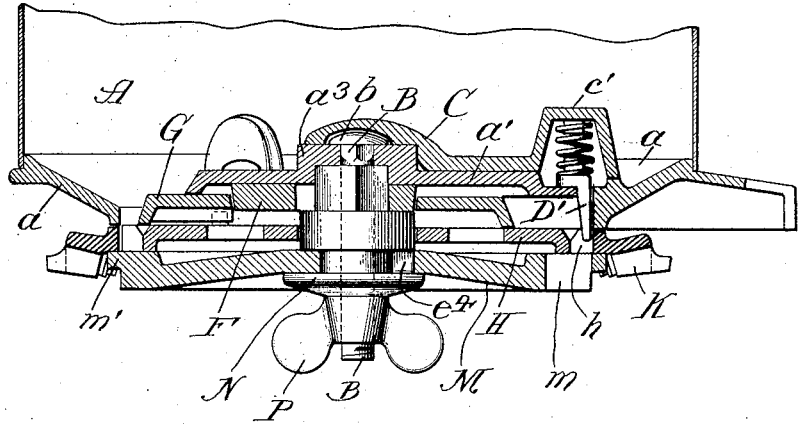
Figure 8:
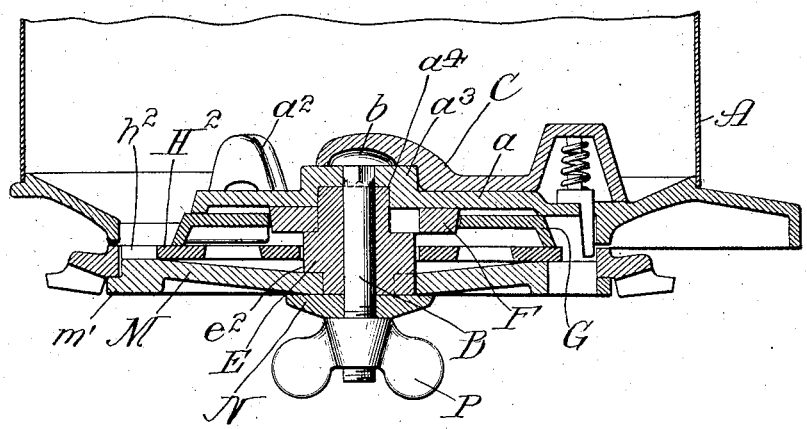
Figure 9:
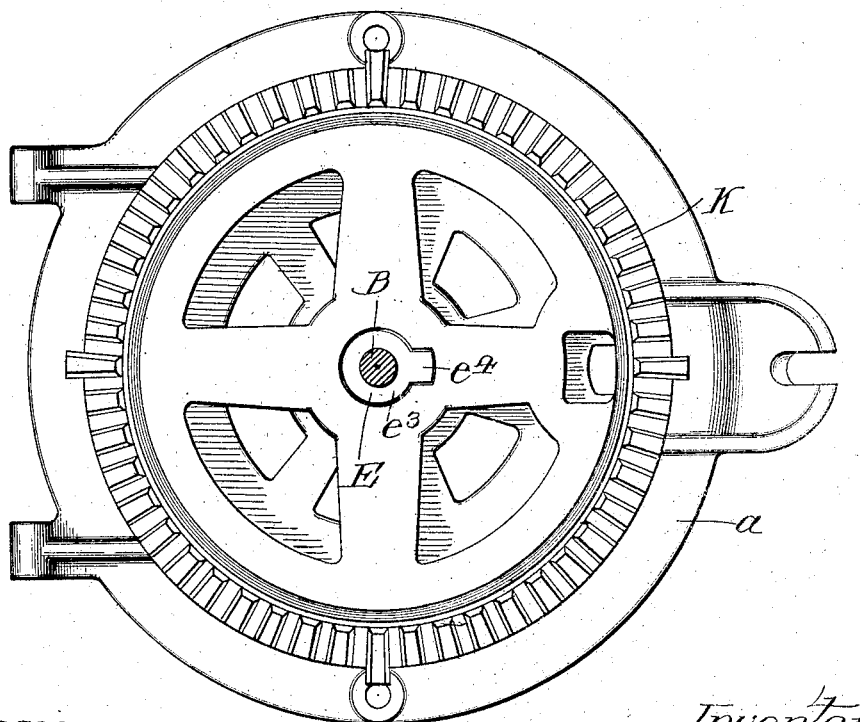

Figure 1 is a plan view of a planter embodying my invention, the parts being arranged for edge-drop planting. Fig. 2 is a view in vertical section on line 2 2 of Fig. 1. Fig. 3 is an inverted plan view of the bottom of the seedbox with the seed-plate and parts normally below it removed, but with the feed-plate and adjustable hub in position and with the adjusting-sleeve and center bolt shown in section. Fig. 4 is a detail perspective view of the adjusting-sleeve. Fig. 5 is a perspective view of the adjustable hub or bearing. Fig. 6 is a perspective view of the under side of the central portion of the seedbox-bottom. Fig. 7 is a detail plan view of a seed-plate adapted for flat-drop planting. Fig. 8 is a view similar to Fig. 2, but showing a flat-drop seed-plate in position for use and showing the bottom guard-plate inverted; and Fig. 9 is a bottom view of the parts shown in Fig. 8 with the bottom-retaining nut and washer removed.

My invention is shown as applied to a planter the seedbox A of which has a bottom comprising an outer circular rim $a$ and an inner or central portion $a'$, these parts being connected together by arches $a^2$. The inner part $a'$ of the seedbox-bottom is shown as formed with a central offset $a^3$, in the top of which is fixed the upper end of the retaining-bolt B. The head $b$ of the bolt B is shown as lying beneath the inner end of a plate C, that is fastened, as by a bolt $c$, (see Fig. 1,) to the inner part $a'$ of the seedbox-bottom, this plate C being formed at its outer end with a raised chambered portion $c'$, adapted to receive the springs for the cut-off D and the knocker D' of suitable construction. The chambered portion $c'$ of the plate C extends above the corresponding recesses formed in the segmental plate $a^5$, whereby the central part $a'$ of the seedbox-bottom is connected to the outer rim $a$.

By reference more particularly to Figs. 2, 6, and 8 of the drawings it will be seen that the inner face of the central part $a'$ of the seedbox-bottom is formed with a polygonal cavity $a^4$, adapted to receive a correspondingly-shaped portion $e$ of the shifting sleeve E. This sleeve E is formed with a central hole $e'$, through which passes the bolt B, and the sleeve E is formed with a concentric bearing portion $e^2$ and with a reduced part $e^3$, having an offset or lug $e^4$, the purpose of which will presently more fully appear. As a matter of convenience one of the corners of the polygonal part $e$ of the sleeve E is cut away, as at $e^5$. Around the polygonal part $e$ of the sleeve E and immediately beneath the central part $a'$ of the seedbox-bottom sets a shifting plate or disk F, (see Figs. 2, 3, 5, and 8,) that is provided with a polygonal opening $f$ of such shape as to receive and engage the polygonal part $e$ of the shifting sleeve in either of two positions, as indicated by full and dotted lines in Fig. 3 of the drawings. Around the plate or disk F sets the feed-plate G, having a concentric opening therein and having a peripheral flange adapted to rest upon the seed-plate beneath it.

In Figs. 1 and 2 of the drawings the seed-plate H there shown is an edge-drop seed-plate—that is to say, the periphery of this plate is formed with long narrow cavities $h$, adapted to receive the grains of corn edgewise from the feed-throat of the seed box. The edge-drop seed-plate H sets within an annular rack-bar K, that will be driven in the usual or suitable manner, and the seed-plates H may be connected to the rack-bar K by interlocking lugs and grooves in the usual manner. The seed-plate H is provided with a central opening through which passes the circular portion $e^2$ of the shifting sleeve E. Beneath the seed-plate H extends the guard-plate M, having a central hole with an offset to receive the reduced portion $e^3$ and offset $e^4$ of the sleeve E. As shown, a washer N, encircling the bolt B, bears against the under side of the guard-plate M and a retaining-nut P engages the threaded lower portion of the bolt to securely hold the parts in position, as clearly shown in Figs. 2 and 8 of the drawings. The guard-plate M is provided with the usual slot or opening $m$ for the passage of grain, and the guard-plate M is dished or offset with respect to its peripheral part for the purpose to be presently explained. The rim or peripheral part of the guard-plate M is formed at one edge with an annular flange $m'$, adapted to bear upon the under side of the plane portion of the annular rack-bar, as shown in Figs. 2 and 8 of the drawings.

When the parts are assembled and arranged as shown in Figs. 1 to 3 of the drawings, with the edge-drop plate H in position for use, the polygonal part $e$ of the shifting sleeve E engages the notches $f''$ farthest from the center of the plate or disk F, as shown in Fig. 3 of the drawings, and thus serves to hold the plate or disk F and the feed-plate G eccentric with respect to the rim $a$ of the seedbox. With the parts in this position the feed throat or channel of the seedbox is of varying width, at its narrowest point being but little broader than the width of the cells $h$ of the edge-drop seed-plate H, as shown in Fig. 1 of the drawings.

When the planter is to be used for flat-drop planting, a seed-plate $H^2$ with broad cells $h^2$ will be substituted for the seed-plate H, above described. When this flat-drop seed-plate is used, the feed-plate G will be shifted so as to make the feed throat or channel of the seedbox of approximately uniform width or at least wide enough at all points to admit the grain flatwise into the cells $h^2$. (See Fig. 8.) In order to adjust the feed-plate G to this approximately concentric position, the upper polygonal part $e$ of the shifting sleeve E will be placed within the notches $f^2$ of the hub or disk F, and when a flat-drop seed-plate $H^2$ is used the guard-plate M would be inverted, as shown in Fig. 8, so that its peripheral part shall extend within the annular rack-bar K. Inasmuch as the guard-plate M has its central part dished or concaved, it will be seen that by thus inverting this plate and bringing the reduced part of its periphery within the annular rack-bar the same guard-plate is adapted for use with a thin flat-drop seed-plate, and the necessity for employing a separate guard-plate is avoided.

I wish it understood that the details of construction above set out may be varied without departure from the spirit of the invention and that features of the invention may be employed without its adoption as an entirety.

Having thus described my invention, what I claim as new, and desire to secure by Letters Patent, is—

1. A convertible edge-drop and flat-drop seed-planter having a seedbox-bottom provided with an outer rim and an adjustable central part coöperating with the said outer rim to form a variable feed-channel.

2. A convertible edge-drop and flat-drop seed-planter having a seedbox-bottom provided with an outer rim, a movable central part coöperating with said outer rim to form a variable feed-channel and means for holding said movable part in different positions.

3. A convertible edge-drop and flat-drop seed-planter having a seedbox-bottom provided with an outer rim, a movable central part coöperating with said outer rim to form a variable feed-channel, an adjustable plate engaging said movable part and whereby it may be adjusted and means for holding said adjustable plate in different positions.

4. A convertible edge-drop and flat-drop seed-planter having a seedbox-bottom provided with an outer rim, a movable central part coöperating with said outer rim to form a variable feed-channel, an adjustable plate setting within said movable part, said plate having an opening therethrough and a part extending downwardly from the seed-box bottom and adapted to engage said adjustable part at different points in order to hold said movable part in different positions.

5. A convertible edge-drop and flat-drop seed-planter having a seedbox-bottom provided with an outer rim and with a central portion, a movable central part located beneath said central portion and coöperating with said outer rim to form a variable feed-channel, a bolt extending downwardly from said central portion of the seedbox-bottom and through said movable part, an adjustable plate setting within said movable part and whereby it may be adjusted and means carried by said bolt for holding said adjustable plate in different positions.

6. A convertible edge-drop and flat-drop seed-planter having a seedbox-bottom provided with an outer rim, an annular central part coöperating with said outer rim to form a variable feed-channel, an adjustable plate setting loosely within said annular central part and whereby it may be adjusted, a bolt extending downwardly from the central part of the seedbox-bottom and an adjusting-sleeve mounted upon said bolt and adapted to engage said adjustable plate at different points in order to hold it in different positions.

7. A convertible edge-drop and flat-drop seed-planter having a seedbox-bottom provided with an outer rim, and with an inner portion having a socket or seat on its under side, a bolt extending downwardly from said inner portion of the seedbox-bottom, an adjusting-sleeve through which said bolt passes having its upper end set within the socket of the inner part of the seedbox-bottom and having a polygonal portion, an adjustable plate arranged to engage said polygonal portion of the adjusting-sleeve at different points and a movable central part coöperating with said outer rim to form a variable feed-channel, said movable central part encircling said adjustable plate.

8. A convertible edge-drop and flat-drop seed-planter having a seedbox-bottom provided with an outer rim, a movable central part coöperating with said outer rim to form a variable feed-channel, an adjustable plate engaging said movable part and having an opening, an adjustable sleeve passing through said opening of the movable plate and adapted to engage said plate at different points, said sleeve being provided with an annular rim or hub to pass through the seed-plate.

9. A convertible edge-drop and flat-drop seed-planter having a seedbox-bottom provided with an outer rim, a movable central part coöperating with said outer rim to form a variable feed-channel, an adjusting-sleeve passing through said movable central part and provided with means for clamping it to the central portion of the seedbox-bottom and an adjustable plate setting loosely within said movable part and surrounding said adjusting-sleeve, said adjustable plate being provided with means whereby it may engage said adjusting-sleeve in different positions.

10. A seed-planter having a seedbox-bottom provided with means for removably holding seed-plates of different thicknesses, in combination with an invertible guard-plate and means for holding said guard-plate in position.

11. A seed-planter having a bottom provided with means for holding seed-plates of different thicknesses, in combination with an invertible guard-plate, said guard-plate being offset at one side of its horizontal plane to adapt it for seed-plates of different thicknesses.

12. A seed-planter having a bottom provided with means for holding seed-plates of different thicknesses, in combination with an invertible guard-plate, said guard-plate being concave to adapt it for seed-plates of different thicknesses, said guard-plate having its periphery formed with a flange adapted to extend below the annular rack-bar whereby the seed-plates will be driven and with a reduced portion adapted to set within said annular rack-bar when the guard-plate is inverted.

EDWARD M. HEYLMAN.

Witnesses:
WILLIAM F. BOSWORTH,
CATHERINE PURCELL.